Aug. 1, 1967  T. BELLIS ET AL  3,333,586
EYE-CARE DEVICES

Filed Nov. 14, 1966  2 Sheets-Sheet 1

INVENTORS.
TED BELLIS
OSCAR H. CHASE
BY S.B. Schlesel
ATTORNEY

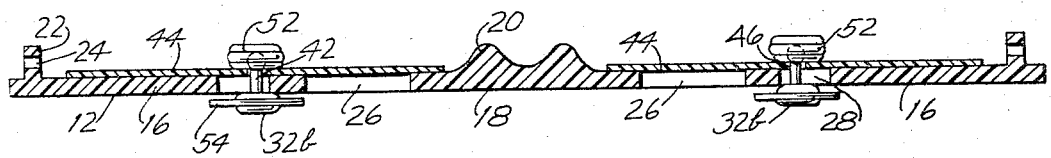
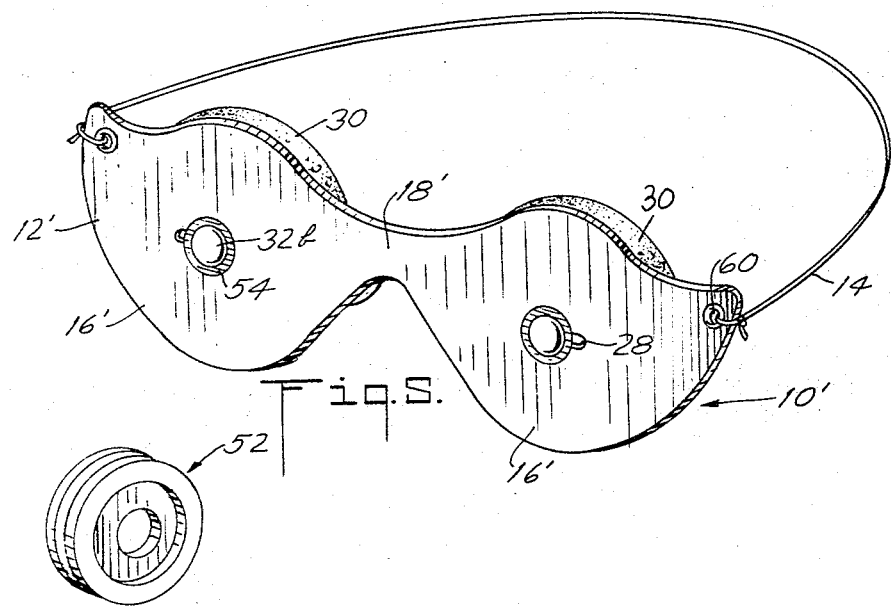
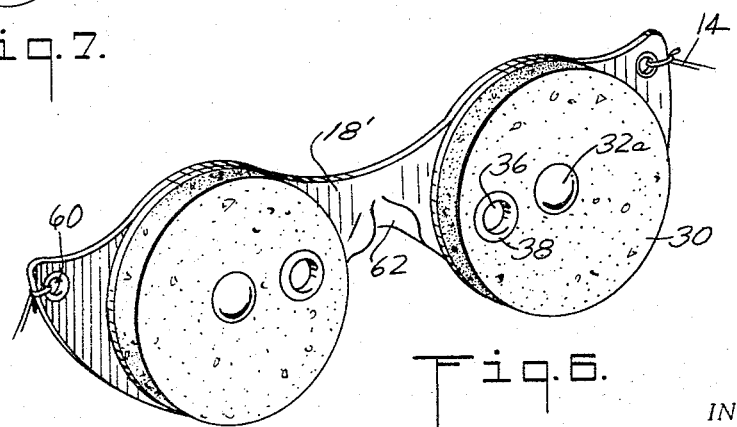

United States Patent Office 3,333,586
Patented Aug. 1, 1967

3,333,586
EYE-CARE DEVICES
Ted Bellis, 1219 Tulip Lane, Wantagh, N.Y. 11793, and Oscar H. Chase, 787 J. F. Kennedy Blvd. E., Weehawken, N.J. 07087
Filed Nov. 14, 1966, Ser. No. 593,837
10 Claims. (Cl. 128—268)

ABSTRACT OF THE DISCLOSURE

An eye-care device comprising a face mask having designated eye area sections, and a soft, spongy pad disposed behind and rotatably secured centrally to each section whereby cosmetic or therapeutic materials applied to the pads will contact the wearer's eyes and eye areas. The eye area sections and the pads have eccentric openings each whereby rotation of each eye pad to bring its opening in registry with the section opening and the wearer's eye permits see-through vision. A rotatable disc disposed intermediate each section and its eye pad provides light filtering when desired.

---

This invention relates generally to the field of eye care, and has for its objective the creation of an eye-care device capable of providing therapeutic, cosmetic or protective treatment, or a combination thereof, for the eyes of the user and at the same time, remaining non-restrictive of either vision or mobility, permitting the user to engage in normal activities during and despite its use.

As is well known, human eyes, eyelids and the skin areas surrounding the eyes are particularly delicate, with the skin thin and sensitive and therefore frequently susceptible to inflammations, irritations, chafing and dryness, as well as to infections too numerous to mention, and the eyes themselves are particularly sensitive to exposures to strong light, dust, strong winds, etc.

Therapeutic treatment of the eyes and their surrounding areas often takes the form of external application of medications, cream or liquid, which are applied to the affected areas directly, and followed by the application of soft, protective pads to the areas for a considerable period of time, or, in the alternative, are applied directly to a soft, spongy pad which is then held against the affected areas for prolonged periods of time. The same holds true with respect to the application of curative or cosmetic creams and lotions used to heal or moisturize the affected skin areas, to correct dryness, chapping and the excess exposure to the element which frequently occurs in normal human activity, as well as other abnormal conditions.

In the present state of the art the foregoing treatments are now accomplished by requiring the patient or subject to sit with head tilted back, or to lie prone, for extended periods of time while loose applicator pads are disposed upon and against the eye areas involved, either to be manually held in place or, where pressure application is not required, remaining in place because of the position of the patient or subject. The same holds true with respect to wet compresses often applied to the eyes to reduce swelling and to alleviate eye-strain, headaches and the like. During such treatments the subject is deprived of vision and consequently of mobility as well, and the time required for treatment is lost and wasted whereas otherwise the subject could be engaged in normal pursuits during the period of application, no matter how long or frequent the treatments, were he or she not so unnecessarily restricted. The benefits to be derived from the saving of such otherwise-lost periods of time, as well as the psychological benefits attendant upon the elimination of tensions and irritations engendered by enforced idleness and inactivity are inestimable.

It is therefore the principal object of our invention to create an eye-cure device comprising a mask detachably securable to the head of the user and provided with soft, spongy pads disposed to lie against and around the eyes of the user.

A second important object of our invention is in the provision of an eye-care device which permits the user to see through the mask and pads while it is in use, thereby retaining normal vision and mobility.

A third important object of our invention is in the provision of an eye-care device of the type described which provides protection to the eyes of the user from the elements while permitting vision therethrough.

A fourth important object of our invention lies in the creation of an eye-care device of the type described in which the eye pads are adapted to receive and dispense medical or cosmetic creams, lotions or liquids to the areas covered.

A fifth important object of our invention lies in the creation of an eye-care device having see-through areas adjustable to accommodate and adjust for variations in the pupillary distances between the eyes of the users, within recognized limits.

A sixth important object of our invention is the provision of an eye-care device of the type described, of which the combination of elements thereof can be selectively varied in accordance with intended function.

A seventh important object of our invention is the provision of an eye-care device of the type described, of which the pad elements no longer useful can be replaced with others without affecting the permanence or durability of tht remainder of the device.

Still another important object of our invention is in the provision of an eye-care device of the type described which is simple and inexpensive to manufacture, and easy to use.

These and other salient objects, advantages and functional features of our invention, together with the novel features of construction, composition and arrangement of parts, will be more readily apparent from an examination of the following description, taken with the accompanying drawings, wherein:

FIG. 4 is a cross-sectional view similar to FIG. 2, but with the eye pads removed and replaced by snap fasteners;

FIG. 5 is a front perspective view of a modified embodiment of our invention;

FIG. 6 is a rear perspective view of the embodiment of FIG. 5; and

FIG. 7 is an enlarged view of the female portion of the snap fastener employed with the embodiment shown.

Similar reference characters designate similar parts throughout the different views.

Figure 1:
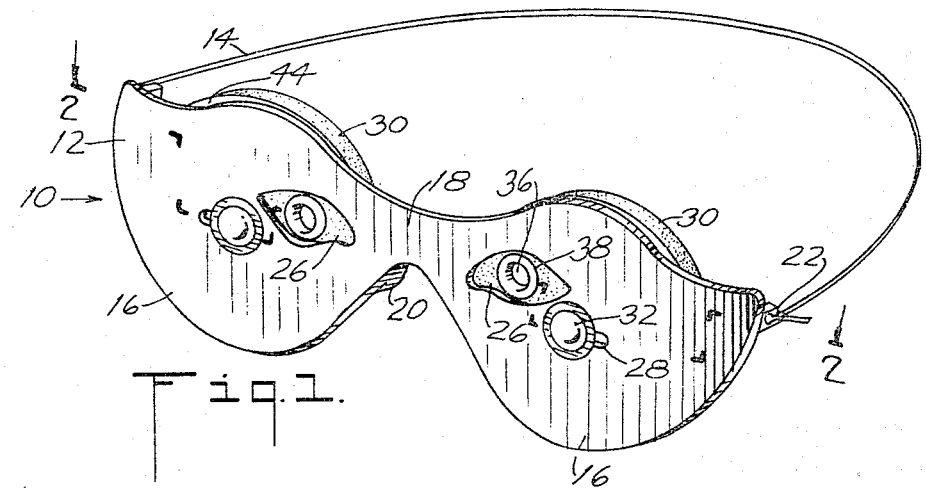
FIG. 1 is a front perspective view of a preferred embodiment of our invention.

Illustrative of the embodiment shown by FIGS. 1–4, our eye-care device 10 comprises an opaque mask 12 provided with an elastic cord 14 by which the mask 12 is secured to the head of the wearer. The mask 12 is provided with eye areas 16 disposed to cover the eyes of the wearer and a reduced central portion 18 adapted to fit across the bridge of the wearer's nose. Extending from the rear edge of the central portion 18 is a contoured flange 20 adapted to rest on the bridge of the wearer's nose when the mask 12 is in position. At each end of the mask 12 there is provided a rearwardly extending lug 22 provided with a central opening 24 through which an end of the cord 14 is secured, as shown. The mask 12, flange 20 and lugs 22 are preferably constructed integrally from a molded plastic material, as is well known in the art, although other suitable materials may be substituted instead.

Each of the eye areas 16 is provided with an aperture 26 disposed to permit direct-through vision to the eyes of the wearer when the mask is in position. The apertures 26 may be contoured, as shown, or of any other shape or design, provided they are sufficiently wide to permit direct through vision to the wearer regardless of the pupillary distance between his or her eyes, within normal standards, for the reasons which will be hereinafter disclosed. Each of the eye areas 16 is also provided centrally with a transverse slot 28, likewise within specific lengths for reasons which will hereinafter be disclosed. Disposed behind each of the eye areas 16 there is provided a circular pad 30 of substantial thickness, as shown, composed of a soft, spongy hydrophilic material, capable of absorbing creams, lotions and liquids and of exuding them under pressure, with the material having the resiliency to return to its normal shape when pressure is released. Numerous synthetic, as well as natural, materials of the above described properties are well known in the art, any of which is suitable for the purposes hereof. Polyurethene is but one of the materials suitable, and has been employed in the embodiments described.

Figure 2:
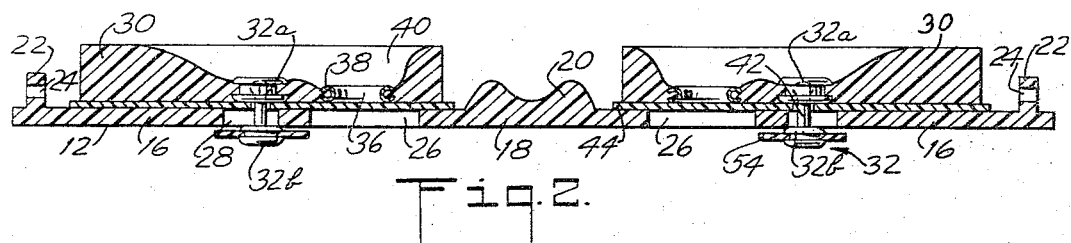
FIG. 2 is an enlarged cross-sectional view taken on lines 2—2 of FIG. 1.

The pads 30 are each provided with the female element 32a of a snap fastener 32 centrally secured therethrough, with the opening thereof facing the rear surface 34 of the mask 12. Each of the pads 30 is also provided with an eccentric opening 36 defined by an eyelet or grommet 38 secured therethrough. The grommet 38 acts to compress the pad 30 in the vicinity of the opening 36 to form a concavity 40 facilitating movement of the user's eyelids when the eye-care device 10 is worn. In combination with the female element 32a of the snap fastener 32, disposed on each pad 30, there is provided a complementary male element 32b, by means of which the pads 30 are secured to the rear surface of the mask 12. As shown by FIG. 2, each of the pads 30 is secured against the rear surface of its respective eye area 16 by the engagement of its female snap element 32a with a male snap element 32b which is passed through the transverse slot 28 from the front of the mask 12, the projection 42 of the male element 32b entering into the slot 28 to engage its respective female snap element 32a, and acting as an axis for the rotation of the respective pad 30. The pads 30 can thus be rotated so that their respective openings 36 may come into registry with the apertures 26 in the respective eye areas 16 of the mask 12 in one position, or may be selectively rotated out of registry. Each of the transverse slots 28 is substantially as wide as the diameter of the projection 42 of the male element 32b, so that transverse movement of the projection 42, in the slot 28, may be accomplished, thereby providing for transverse shifting of the pad 30 along the length of the transverse slots 28, with a fairly snug engagement. The length of the transverse slots 28 are sufficient to account for normal variations of pupillary distance of the eyes of various wearers.

As is apparent, when the eye-care device 10 is positioned on the head of the wearer, with the openings 36 in the pads 30 in registery with the apertures 26 in the mask 12, the wearer should have normal see-through vision through the pads 30 and mask 12. Due, however, to the variations in pupillary distances aforementioned, the pads 30 may require transverse adjustment with respect to the mask 12 so that the openings 36 will be directly centered with the pupils of the wearer's eyes, for greater comfort and visibility. Provision has therefore been made for such modifications in the length of the transverse slots 28.

Figure 3:
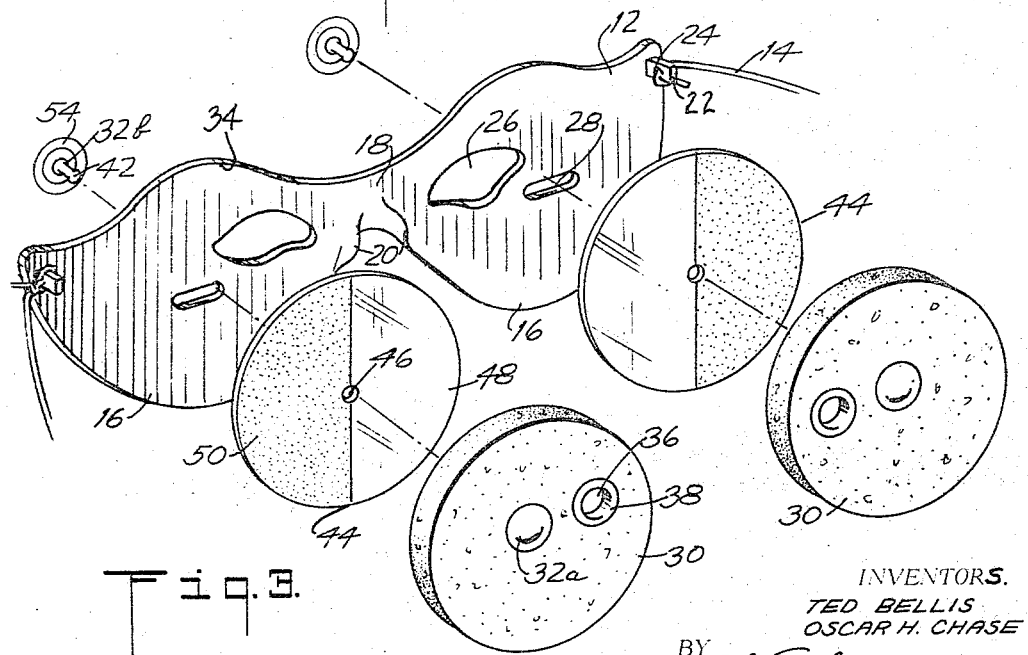
FIG. 3 is a rear, exploded view of the embodiment of FIG. 1.

In addition to the foregoing elements there is further provided for each of the eye areas 16 a disc 44 provided with a small central opening 46, with its surface provided with a transparent area 48 and a light-filtering area 50, as shown in FIG. 3. The disc 44 is of a diameter slightly larger than the diameter of the pad 30 but smaller than the height of the eye area 16, and is mounted between the pad 30 and the rear surface of the respective eye area 16 by the engagement of the snap fastener projection 42 through the opening 46, as shown in FIG. 2. The discs 44 are rotatable independent of the pads 30, so that either the transparent area 48 or the light-filtering area 50 may by selectively disposed to come in registry with the aperture 26 and opening 36.

In the utilization of our eye-care device 10, when it is desired to employ same for therapeutic or cosmetic treatment, the medication or lotion is applied directly to the rear surface of the pads 30 (or in some instances directly on the eyelids and skin areas instead), and the mask 12 is attached to the wearer's head, with the openings 36 in registry with the respective apertures 26, and the discs 44 rotated so that the transparent areas 48 are in registry with both. The wearer then shifts the pads 30 in the slots 28 until central vision is obtained. In this position the wearer can proceed with his or her normal activities while the treatment continues, for as long as application is necessary or desired. The transparent areas 48 of the discs 44 prevent wind, dust, fumes, etc., from entering the wearer's eyes through the apertures 26 and the pads 30 from the edges of the mask 12. Should the wearer desire to go out into strong sunlight the discs 44 alone are roatated until the light-filtering areas 50 are in registry with the apertures 26 and openings 36, and the eyes are thereby shielded from the sun's glare as well. In the event that the wearer does not wish to have vision through the mask 12 the pads 30 are rotated until the openings 36 are no longer in registry with the apertures 26, and the eyes are thereby completely protected from light. In this connection it must be pointed out that, without medication or cosmetic, the eye-care device 10 becomes a perfect sleeping mask. It is also to be noted that our eye-care device 10 can also serve as sunglasses alone. For this use the pads 30 are snapped off, and the discs 44 are held in position by substitute female snap fastener elements 52 as are shown in FIG. 7. In FIGS. 1 and 2 the male snap element 32b is shown provided with a surrounding plastic finger piece 54 to facilitate removal and reattachment.

Coming now to a modified and simplified embodiment of our invention, as shown in FIGS. 5 and 6, the eye-care device 10' comprises a plastic mask 12' of the same shape as the mask 12, provided with eyelets 60 through which the ends of the elastic cord 14 are secured, as shown. The mask 12', however, is not opaque but is tinted in a light-filtering color, and is either stamped or press-punched out of plastic sheeting. The central area 18' is provided with moleskin sections 62 to protect the bridge of the wearer's nose, in place of the flange 20 shown in the first embodiment. The eye areas 16' are each provided with the same transverse slots 28, and the eye pads 30 are identical with those of the embodiment of FIGS. 1–4.

The eye-care device 10' is used in the same manner as the device 10 for therapeutic or cosmetic treatment of the eyes and the eye areas. Vision is provided by bringing the openings 36 in registry with the eyes of the wearer, and adjustment for pupillary distances made as with the device 10. In this position the wearer obtains light-filtered vision, with the same protection as is afforded with the device 10, and the same complete eye coverage by rotating the pads 30 so that the openings 36 are out of registry with the eyes. In this embodiment the pads 30, with their female snap fasteners 32a, and the male snap fasteners 32b, may be removed completely from the mask 12', and the latter worn as sun glasses.

It is thus clearly apparent that our invention is capable of performing many functions, e.g., as a therapeutic or cosmetic eye treatment with or without vision; when used with vision, clear or light-filtered vision may be selected; with the removal of the pads 30 either device 10 or 10′ becomes a pair of sun glasses. They may also be used as eye protectors for employees in industrial and chemical plants. Additional uses will be found by those skilled in the art.

An additional feature of our invention is to be found in the convenient means of assembly and disassembly, and in the fact that the pads 30 are disposable after use, and can be replaced by fresh pads 30 as often as desired without the necessity of replacing the other and more permanent elements of the devices 10 and 10′. The pads 30 are likewise interchangeable, and, where only one eye requires treatment, the other pad 30 may be removed from the device.

The embodiments thus shown and described, therefore, are by way of illustration and not of limitation, and various changes may be made in the construction, composition and arrangement of parts without limitation upon or departure from the spirit and scope of the invention, or sacrificing any of the advantages thereof inherent therein, all of which are claimed as hereinafter set forth.

Having described our invention, we claim:

1. An eye-care device comprising a substantially rigid face mask adapted to cover the eyes of the wearer and means to retain the mask in such position, the mask comprising a pair of eye area sections integral with an intervening bridge section, a soft, spongy eye pad disposed behind each eye area section parallel to and flush with its rear surface and means to rotatably secure each eye pad centrally to its respective eye area section whereby each eye pad may be rotated on a plane parallel to its respective area section.

2. An eye-care device as described in claim 1, the mask being opaque, with each eye area section thereof provided with an aperture disposed in registry with one eye of the wearer, each eye pad centrally secured to its respective eye area section with the securing means adapted to allow rotative movement of the eye pad with respect to said eye area section on a plane parallel thereto, an eccentric opening in each eye pad disposed to come in registry with the aperture in its respective eye area section upon selective rotation of the eye pad.

3. An eye-care device as described in claim 2, the means to secure each eye pad rotatively to its respective eye area section comprising a central opening in said eye area section and a snap fastener extending therethrough, one element of the snap fastener secured to the eye pad and the complementary element thereof extending through the central opening in the eye area section from the front surface thereof and locked to the first element.

4. An eye-care device as described in claim 3, the central opening in each eye area section of the mask comprising a transverse slot.

5. An eye-care device as described in claim 4, a circular disc disposed between each eye pad and its respective eye area section in parallel relationship thereto, the disc being of a diameter sufficient to cover the eccentric opening in the eye pad and provided with a central opening disposed to be rotatively engaged by the snap fastener for selective rotation of the disc independent of the eye pad, the disc provided with a transparent area and a light-filtering area whereby rotation of the disc selectively disposes either area between the aperture in the eye area section and the opening in the eye pad, all in registry with one another.

6. An eye-care device as described in claim 2, the eccentric opening in each eye pad provided with a grommet secured therethrough and adapted to compress the eye pad in the area thereof adjacent said opening.

7. An eye-care device as described in claim 1, the face mask composed of a light-filtering material, and an eccentric opening in each eye pad disposed to come in registry with one eye of the wearer upon selective rotation of the eye pad.

8. An eye-care device as described in claim 7, the means to secure each eye pad rotatively to its respective eye area section comprising a central opening in the eye area section and a snap fastener extending therethrough, one element of the snap fastener secured to the eye pad and the complementary element thereof extending through said central opening from the front surface of the mask and locked to the first element.

9. An eye-care device as described in claim 8, the central opening in each eye area section of the mask comprising a transverse slot.

10. An eye-care device as described in claim 9, the eye pads being each provided with a grommet secured through its eccentric opening and adapted to compress the eye pad in the area thereof adjacent said opening.

References Cited
UNITED STATES PATENTS

| | | | |
|---|---|---|---|
| 2,172,573 | 9/1939 | Blumenthal | 2—13 |
| 2,342,840 | 2/1944 | Cadous | 128—268 |
| 2,343,157 | 2/1944 | Zuering | 2—12 |
| 2,773,422 | 12/1956 | Flynn et al. | 88—41 |

ADELE M. EAGER, *Primary Examiner.*